INVENTOR
VICTOR RAKOWSKY,
BY
ATTORNEY

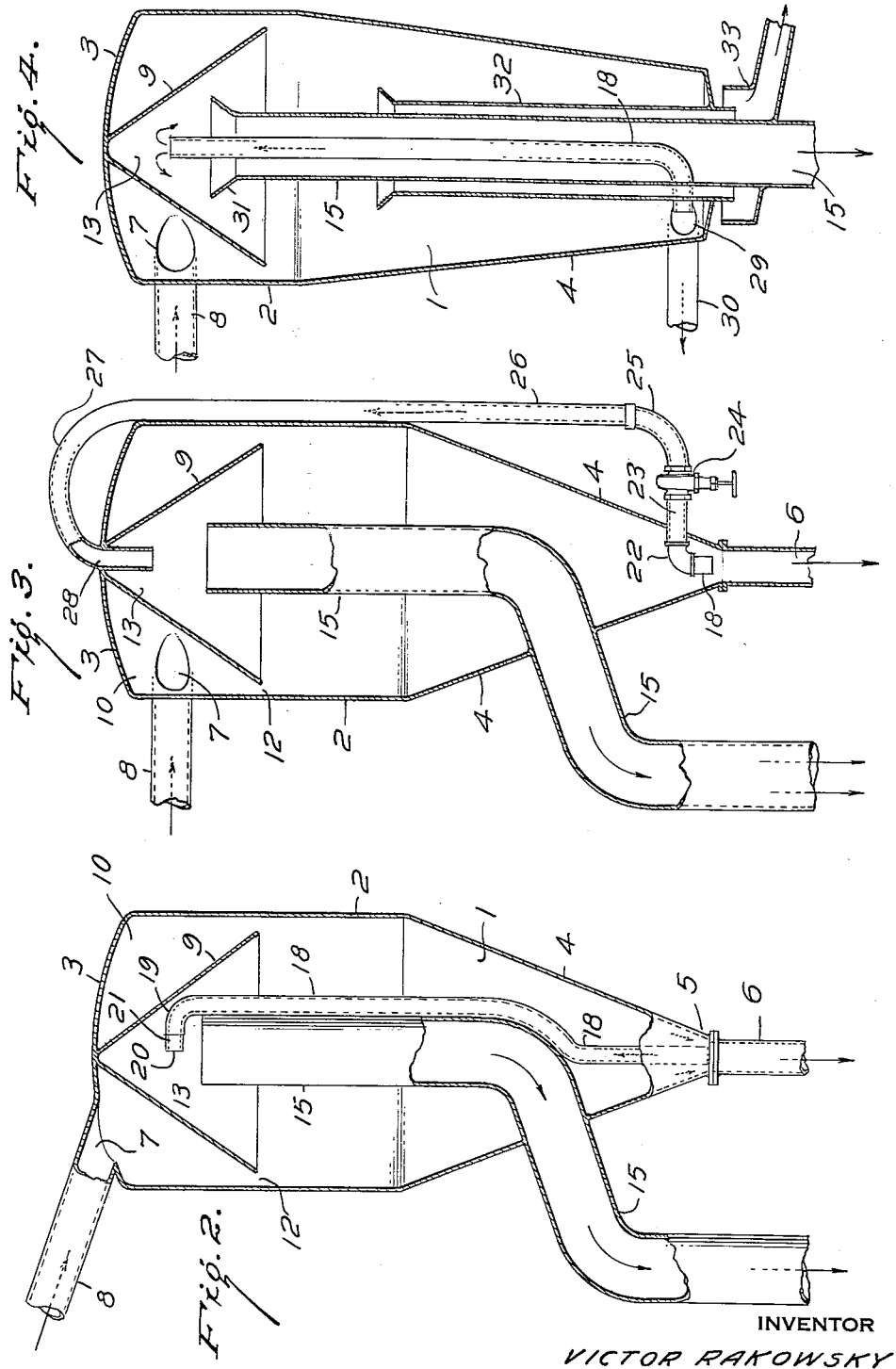

Dec. 13, 1955 V. RAKOWSKY 2,726,767
DENSIFYING OF SOLIDS-LIQUID MIXTURES
Filed Aug. 14, 1951 4 Sheets-Sheet 3
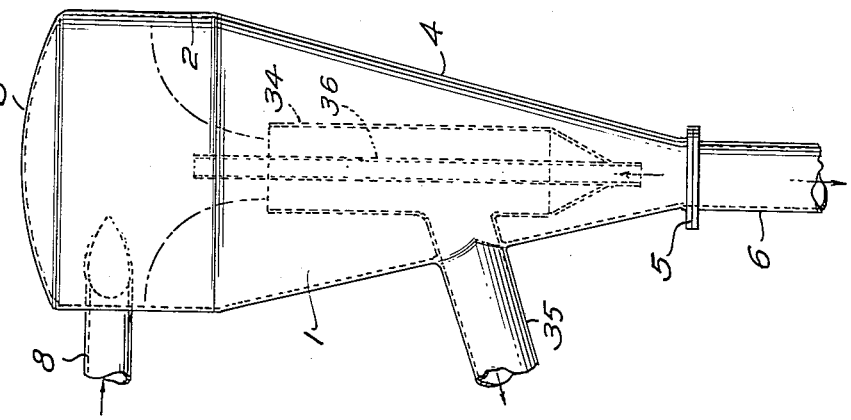
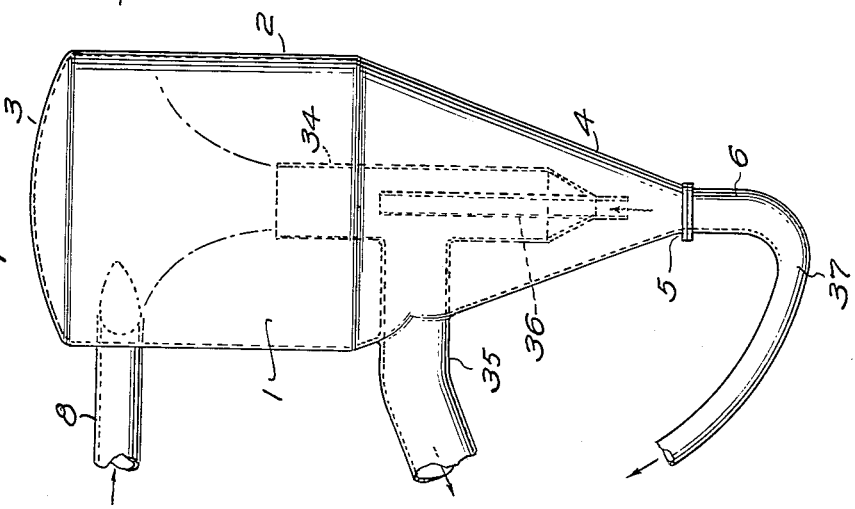
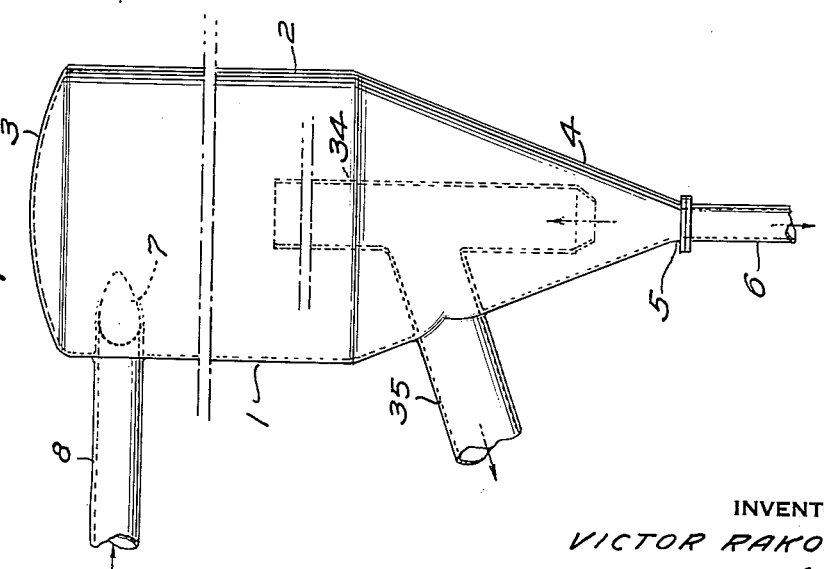
INVENTOR
VICTOR RAKOWSKY,
BY
ATTORNEY Dec. 13, 1955  V. RAKOWSKY  2,726,767
DENSIFYING OF SOLIDS-LIQUID MIXTURES
Filed Aug. 14, 1951  4 Sheets-Sheet 4

INVENTOR
VICTOR RAKOWSKY,
BY
ATTORNEY

United States Patent Office 2,726,767
Patented Dec. 13, 1955

2,726,767

DENSIFYING OF SOLIDS-LIQUID MIXTURES

Victor Rakowsky, Joplin, Mo.

Application August 14, 1951, Serial No. 241,723

10 Claims. (Cl. 209—211)

This invention is concerned with the densification of solids-liquids mixtures. As such, it contemplates an improved method and apparatus particularly adapted for densifying slurries of mixed fine solids. It relates not only to a novel separatory-densification method which involves several novel principles but also to apparatus in which is embodied the use of the principles.

In many differing types of industry, problems are frequently encountered wherein it is necessary to densify a solids-liquid mixture, usually, but not necessarily, an aqueous slurry. In some cases, frequently encountered for example in the mineral dressing arts, it is desirable to treat a slurry of small, usually minus 30 mesh, mixed solids, including fines and slimes to produce, as a thickened slurry, a concentrate of one of the solids. This thickened slurry should contain a maximum proportion of the desired solids and be as free as possible from any other solid components. The latter should be passed off with the discharge of excess fluid. It is with the latter type of thickener-separator operation that the present invention is particularly concerned.

Various thickening devices are industrially available. Many of them are highly efficient in operation. In general, however, they are subject to certain inherent limitations. Some require very large permanent installations which represent a large investment and in addition require a tremendous inventory of material in process. Some, such as the various centrifugal separators, while smaller, are perhaps equally expensive to install and maintain in effective operating condition. Some, such as the recently developed cyclone types of thickeners, while small themselves, require large installations of ancillary apparatus, including a high pumping capacity to deliver the slurry in sufficient volume and at the requisite high pressures.

It is, therefore, the principal object of the present invention to devise a concentrating-thickening system which is not subject to these limitations. Such a system should be relatively small in size, involve few moving parts, be readily and economically constructed, be efficient in operation without excessive supervision and should not require excessive investments in ancillary equipment.

In general, these objects have been accomplished in a surprisingly efficient, simple and small apparatus by utilizing a novel thickening principle. Broadly, this operating principle is simple. Slurry to be thickened is forced along a spiralling path within a relatively small confined space. This spirally flowing fluid is subjected to a progressively increasing compressing force by moving it through a vertical zone the area of which is progressively decreased and the lower levels of which are annular in cross section. The velocity increases in passing through the zone of progressively decreasing cross-section. The resulting centrifugal and centripetal forces cause the less-dense solids to move toward the center of the zone and the heavier solids toward the outer wall. They also form an open vortex from the top of the enclosed zone down into a tubular element which, with the outer wall, forms the lower annular zone. Fluid forming this inner whirl is removed from the confined space down the tubular element. Preferably the unit is operated vertically and this removal can be done through a downwardly extending main central discharge conduit.

Most of the fluid and a major portion of the lighter density solids in the slurry flow are carried at or near the surface of the whirlpool. They are whirled back into the inner space and then through the central discharge. The remaining thickened slurry of fluid and more dense solids is carried on through the remaining length of the vertical confined space and discharged through a suitable opening in or near the end of that space at about its center.

It is believed this operating principle is new in and of itself. However, perhaps the most novel feature of the invention is in an application of the discovery that the action of the fluid whirl sets up a high vacuum within the center space above the fluid surface and within the vortex. Accordingly, a suitable open conduit is provided, opening in an area close to the center of the thickened-slurry, discharge-opening and extending into the vacuumized, confined space above the whirling fluid. As a result, the vacuum pulls additional fluid and light solids up into the vacuum space and these are thus discharged onto the whirling fluid and thereby are carried into the main excess fluids discharge opening at the center of the whirl. In this way, a fraction of the original volume, containing as its solids content substantially only higher density solids in a very thick slurry, is discharged from the lower end of the confined space.

Further discussion of the principles of the present invention may be more readily understood with reference to the accompanying drawings, in which:

Figures 2–7 are also elevations, partly in section, of differing modifications showing variations of the apparatus embodying these principles.

Figure 1:
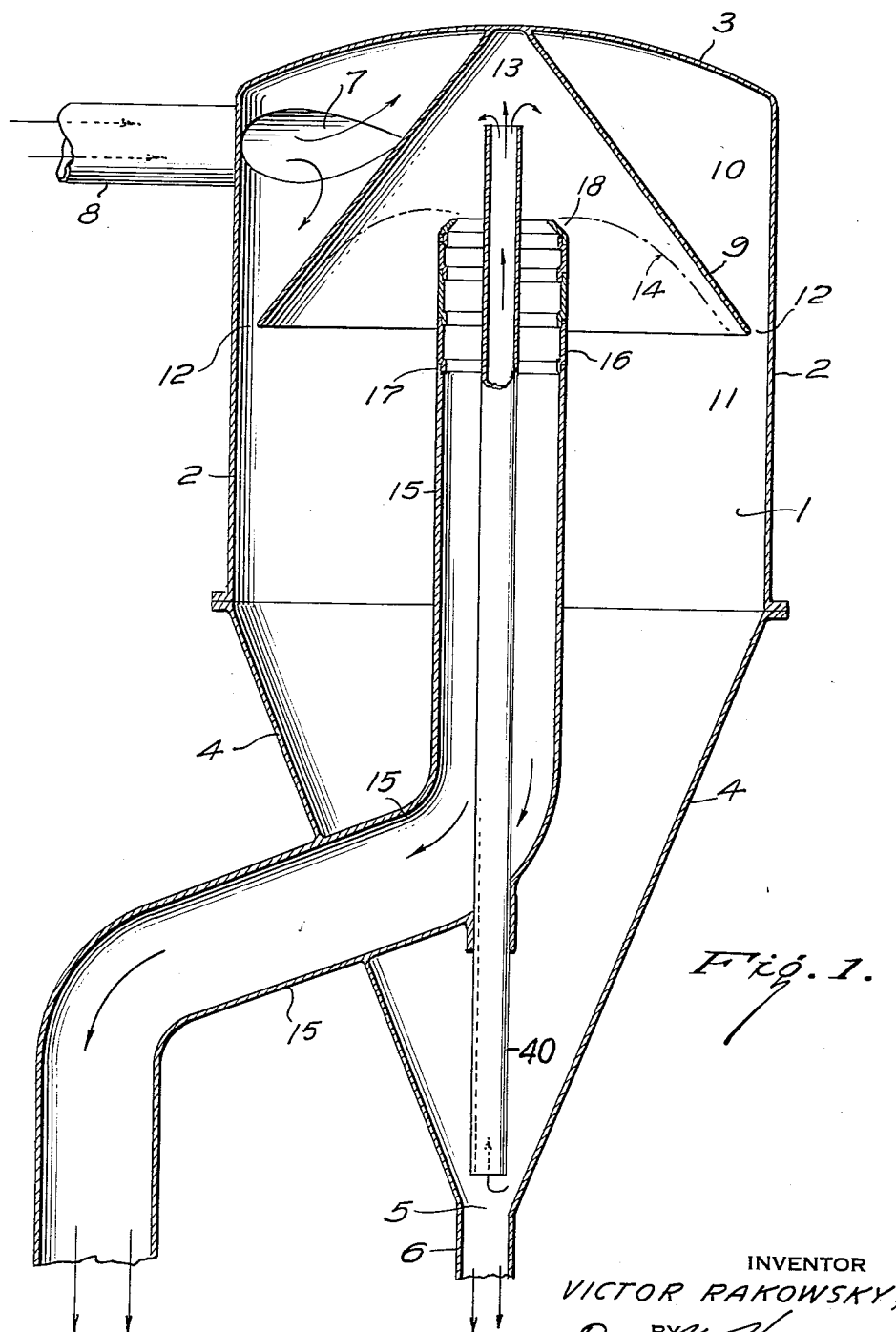
Figure 1 is an elevation, partly in section, showing a simple modification of an apparatus embodying these principles.

It will be seen from a study of Figure 1 that the essential apparatus limitations are simple. The outer configuration of the apparatus is not a critical limitation. However, as was noted above, best results are obtained when there is an upper cylindrical section substantially circular in cross section, surmounting a conical section which is somewhat smaller at the bottom than at the top. As seen in Figure 1, such a structure is there employed.

A confined space, generally designated 1, is enclosed by an upper vertical cylindrical section 2, the top of which is closed by a suitable cover plate 3, unitarily attached as by riveting or welding. Plate 3 has been shown as slightly domed. This is a desirable but not a necessary characteristic. The lower end of cylinder 2 is unitarily attached, as by bolting, riveting or welding to the largest diameter of an inverted conical frustum 4. At the lower or smaller end of frustum 4 is a suitable thickened-slurry discharge-conduit port 5 opening into a discharge conduit 6.

Fluid is introduced into the confined space, preferably just below the cover plate or dome 3, through an entrance port 7. Port 7 should preferably, but not necessarily, be tangential to the wall of cylindrical section 2. A suitable fluid inlet conduit 8 of suitable diameter to completely fill port 7 is unitarily attached thereto in any suitable manner, usually by welding.

Unitarily attached to and dependent from the approximate center of cover plate or dome 3 is a conical baffle 9. Baffle 9 flares outwardly and downwardly into the confined space within cylindrical section 2, to a substantially larger outer diameter approximating that of the inner diameter of cylindrical section 2. Baffle 9 in effect thereby divides the enclosed space into an upper annular zone 10 and lower cylindrical zone 11 connected through an open annular port 12.

It will be seen, then, that fluid entering the upper portion of confined space 1, through port 7, will travel spirally around and down at an increasing velocity under the increasing compression provided by baffle 9. The effect is to apply increasing pressure, thus increasing the velocity, until the liquid passes through the annular port 12 at the lower end of baffle 9. Passing through this port the confining pressure is suddenly released. As noted above, due to the increasing centrifugal and centripetal forces exerted on the slurry in annular zone 10, the less dense solids, particularly those of the finest sizes, tend to accumulate near and travel down the upper surface of baffle 9. On the other hand, the relatively more dense particles will tend to accumulate near and travel down the inner surface of cylindrical section 2. On a sudden release of pressure in passing through annular port 12, a major portion of the fluid together with its contained lighter and finer solids tends to flow up into the central space 13 inside baffle 9. This fluid continues to move spirally but tends to move upwardly rather than downwardly. As a result, it forms an inverted funnel-like whirlpool, the approximate configuration of which is indicated by the dot-and-dash line 14.

It will be seen that the inner edges of this whirling vortex are at a level considerably higher than the bottom of baffle 9. It will also be seen that the upper edge of a suitable central discharge conduit 15 has been located at approximately this level. Conduit 15 comprises an open topped, space confining means within the tubular shell and substantially concentric therewith, and a discharge conduit in open communication with the space confining means and leading to the exterior of the shell. The upper end of conduit 15 may be required to be at different heights for different types of operation, depending to some extent upon the degree of thickening desired. For this purpose a series of rings 16, of substantially the same diameter as conduit 15, have been provided. These may be slipped onto the top of conduit 15 and are held in place by some suitable means such as flanges 17. As shown, these rings may be of differing heights to provide suitable adjustment. The upper ring may also be tapered inwardly as shown at 40 if it is desirable to temporarily decrease the opening into conduit 15.

Conduit 15 extends down through confined space 1 to a lower level therein and passes out through the side-wall of conical section 4. The lower end of conduit 15, which is not shown, may be located as desired and may be open. Thus, fluid flowing into the central vortex at the top of whirl 14 may flow downwardly and be delivered to any desired point.

As was noted above, it has been found, according to this invention, that a very appreciable vacuum is created by the action of this vortex 14 as it is discharged through the central opening at the top of conduit 15. This vacuum is created in enclosed space 13 above whirl 14 and below baffle 9. Accordingly, a suitable open conduit 18 is provided, extending from an area near the bottom of enclosed space 1 and above the discharge port 5 up into the vacuum space 13 under baffle 9. As shown, conduit 15 is provided with suitable opening and packing means in the side thereof to permit conduit 18 to extend upwardly within the vertical section of conduit 15 and concentric therewith. Conduit 18 extends through and a considerable distance above the upper open end of conduit 15.

Fluid slurry in flowing down through the lower part of cylinder 1 and conical section 4 is still moving in a spirally downward path. Due to the shape of the confining walls 4, it is subjected to an increasing compressing force. The effect of the centrifugal and centripetal forces in and on this fluid as it flows downward is to produce an increasing density differential between the inner wall of conical section 4 and the center of enclosed space 1. Lighter or smaller solids tend to accumulate at the vertical center of the vessel and the heavier or larger solids at the confining walls. The vacuum created under baffle 9 thus draws a considerable amount of this fluid together with any lighter solids therein up through vacuum conduit 18. This is discharged from conduit 18 under baffle 9 and flows down conduit 15 along with the fluid withdrawn from vortex 14.

It is believed that the structure and operation of the thickener is apparent from the foregoing discussion. The operating principles of first subjecting the whirling fluid in a confined space to a continually increasing pressure and suddenly releasing the pressure draws much of the fluid and the finer and lighter solids to the center where they are discharged downwardly and out. The remainder of the fluid, flowing spirally downward also develops a density differential decreasing toward the center of the confined space. Discharge of thickened slurry is at the bottom. The vacuum, created by the whirlpool and the discharge of the initial light fraction, draws the central or lighter fractions from the spiral downward flow back up into an area at the top of the confined space to be discharged as part of the excess fluid discharge. So long as these several functions are maintained, the specific shape of the apparatus is relatively immaterial.

For these reasons, several additional structural modifications have been shown in Figures 2 to 7. For example, as seen in Figure 2 it is not necessary that the upward ascent of vacuum conduit 18 be concentric with central discharge conduit 15. Instead it is carried upward along the outside of conduit 15 to a level with vacuum space 13. Conduit 18 is then turned inward through a suitable elbow 19 and discharges horizontally through the open end 20 of a short nipple 21.

In the modifications shown in Figures 1 and 2 the volume raised through the vacuum conduit 18 cannot be varied except by altering the general flow conditions within the thickener. Provision for this control may be made in any suitable manner. One such arrangement is shown in Figure 3. Conduit 18, instead of rising vertically through space 1, is almost immediately turned through a suitable elbow 22 out through the side wall of conical section 4 into a horizontal conduit 23. Fluid then passes through a suitable valve 24 into an upwardly turning elbow 25, then through a vertical riser 26 to a level above the top of dome 3, through a return bend 27, through a port 28 at the top center of dome 3 and into vacuum space 13 beneath baffle 9. In this way, the amount of fluid drawn into conduit 18 may be regulated by adjustment of valve 24 without changing the rate of fluid input into the space 10. Valve 24 should be of as simple and rugged construction as possible due to the nature of the material handled.

Downward discharge conduit 15 need not necessarily be carried out through side wall of conical section 4 as done in Figures 1, 2 and 3. Nor is it necessary to remove the thickened slurry downwardly and outwardly from the bottom of the vessel. One alternative arrangement is shown in Figure 4. Conduit 15 is there carried directly down through confined space 1 and out at the bottom of the vessel. Near the bottom of confined space 1 there is an annular tangential port 29 opening out through the wall of conical section 4. It opens into a suitable conduit 30 which performs the same function as conduit 6 in the other modifications. Vacuum conduit 18 starts near the exit port 29 and is carried into the central conduit 15 turning vertically and ascending concentrically through conduit 15 to a level above the top of the latter within space 13 under the baffle 9.

Another modification is also shown in Figure 4. It is sometimes desirable to increase the volume of flow down the central conduit 15 by flaring its top outwardly and upwardly. This modification is shown in Figure 4 as the outwardly flaring conical frustum section 31.

One additional modification is also shown in Figure 4. In some cases the slurry to be thickened will contain such a great preponderance of fines and slimes that a sufficient amount of this material cannot be eliminated to the extent desired by the novel action of the normal discharges through conduits 6 and 15, as altered by the vacuum conduit 18. In such cases, an additional central discharge conduit may be provided to discharge additional fluid with so much of the fines and slimes as have been brought to the central portion of the confined space 1 by the centrifugal and centripetal forces subsequently acting on the fluid as it flows downwardly and around in conical section 4. Such an additional central conduit 32 has been shown in Figure 4. At its bottom end conduit 32 discharges into a suitable circular launder 33.

Figures 5, 6 and 7 illustrate additional structural modifications whereby the difference in pressure created by the whirlpool and discharging light fraction may be utilized to further thicken the slurry. As seen in Figure 5, for example, the central discharge means may comprise a conduit 34 located in the horizontal center of confined space 1 and extending from an intermediate level therein downwardly to open at a level adjacent product discharge port 5. In open communication with the interior of conduit 34 is branch conduit 35 through which fluid and the light fraction are discharged. The pressure differential created by the whirlpool and discharging light fraction draws further fluid and lighter density solids from adjacent port 5 up through the bottom open end of and into conduit 34 for discharge through conduit 35.

Conduit 35 may communicate at a lower level with conduit 34 than that shown to create a more efficient discharge of solids and fluid drawn into conduit 34 through the lower end thereof. However, Figure 6 shows a more satisfactory arrangement for insuring efficient discharge. In general, the arrangement is similar to that of Figure 5, but includes a smaller diameter conduit 36 extending from a lower level adjacent port 5 up through the enclosed bottom and into conduit 34 to open at a level intermediate the ends thereof into the air space created by the whirlpool. The vacuum effect created by the whirlpool thus pulls additional lighter density solids and fluid up through conduit 36 to be discharged through conduit 35.

Figure 7 shows a modified form of Figure 6 to the extent that conduit 36 extends completely through and out of the top end of conduit 34. Such an arrangement insures the top end of conduit 36 communicating at all times with the air space, without variations in whirlpool shape causing fluid to enter the conduit, as may occur in the modification of Figure 6.

Conduit 35 may extend from conduit 34 through the wall of section 4 at any angle. Positioning of conduit 34 as shown in Figure 6, however, is structurally more simplified than the arrangement shown in Figures 5 and 7. Figures 6 and 7 illustrate the lower end of conduit 34 as being tapered inwardly more than that shown in Figure 5. A lesser resistance to the flow in the annular space is thereby created.

Although none of Figures 5, 6 or 7 are described in conjunction with an upper baffle means as illustrated in Figure 1, any of the modifications shown by these figures may be obviously further modified to include such a baffle. Various arrangements of control means may be employed for regulating the flow of product through port 5 and conduit 6. A flexible conduit, such as conduit 37 in Figure 6, for example, may be employed. By varying the height of the discharge end of this conduit, the flow of product from the device may be effectively throttled.

Figure 8:
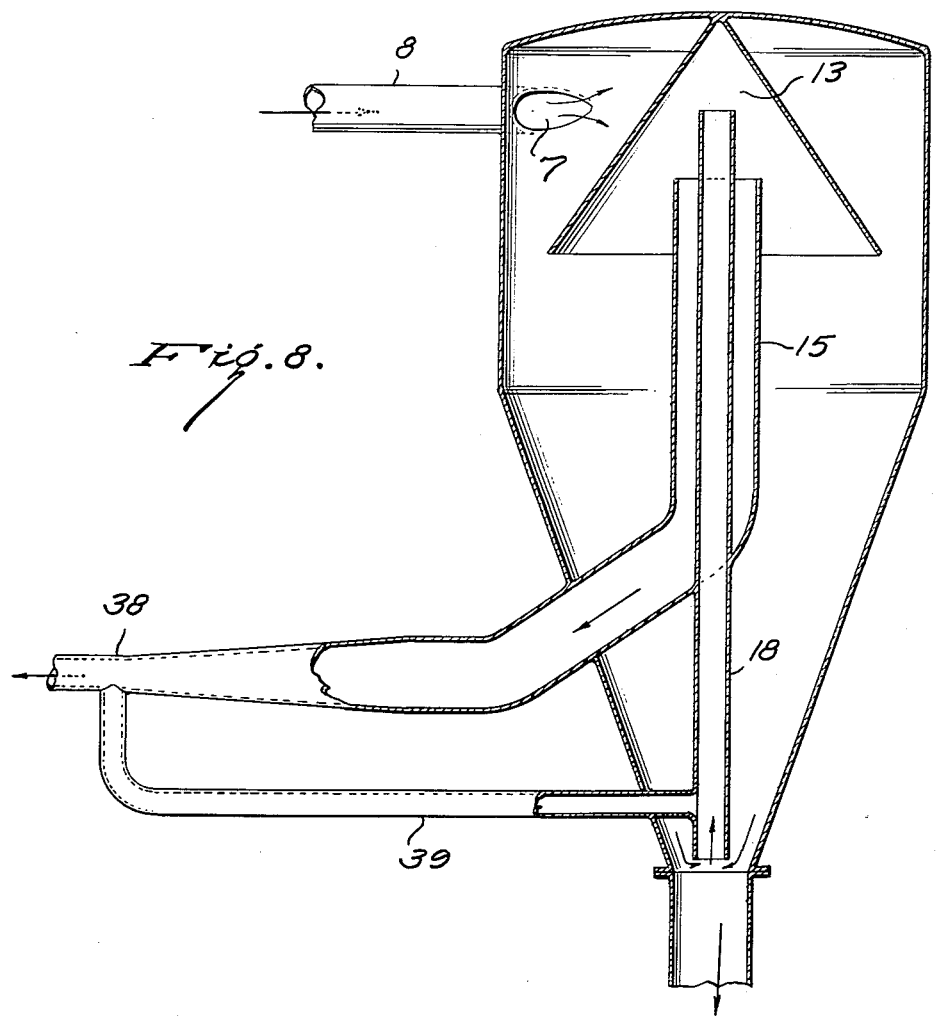
Figure 8, also an elevation, partly in section, shows a still further modification in which part of the back drawn fluid may be discharged in a different manner.

Figure 8 illustrates a further modification whereby the suction effect of the vacuum in space 13 of Figure 1 may be supplemented. As shown, the fluid discharging through conduit 15 is subsequently passed through a Venturi throat 38 whereby the velocity of the fluid is increased. Opening into the Venturi throat and communicating with the lower end of conduit 18 is a conduit 39. As the discharging fluid rushes through the Venturi throat past the opened end of pipe 39, a vacuum is created which will draw into conduits 18 and 39 the central or lighter fraction of the spiralling downward flow. This arrangement supplements the flow to vacuum space 13, or alternatively, it may be employed independently.

As will be seen from the foregoing discussion, apparatus involving the principles of the present invention provide for their own application of confining pressures and the sudden release thereof. As a result, it is not necessary to force the fluid to be treated into a thickener at high pressures. The only requisite feed pressure is one sufficient to force the required volume through the apparatus. It is this volume of flow and not the original inlet pressure thereon which produces the thickening and separating actions.

This is a definite advantage in that the pumping facilities required may be much smaller than for cyclone-type thickeners. The latter must necessarily employ sufficient inlet pressure to create a downward vortex for the more dense material and an inverted upward central vortex carrying out excess water, fines and slimes.

A further advantage is obtained in that not using any inverted upward vortex, the inherent wobbling characteristics thereof with its resultant variations in the thickening and effectivness of cleaning is eliminated. A thickener of the type of the present invention having approximately the same size as a known cyclone thickener and handling an equal flow but at lower inlet pressures, will produce a satisfactorily densified product. The product, furthermore, is considerably more nearly free from unwanted slimes and fines.

*Example*

As illustrative of the efficacy of the apparatus, a test on heavy-media washings, including ore fines and slimes, magnetite and ferro-silicon, at a density of about 1.20, was put through a test unit of the type shown in Figure 6 above at about 15 pounds per square inch gauge. A dense fraction low in fines and slimes and suitable for recycling without further cleaning was obtained at a density of 3.40. The light fraction discharge was at 1.050.

Reference is here made to applicant's copending applications Serial Numbers 241,721, 241,722, 241,724 and 241,725, all filed of even date.

I claim:
1. A method of treating a dilute slurry containing small particles of differing average specific gravity to produce a thickened product fraction containing as it principal solid component only particles of the higher specific gravities, which method comprises: establishing a spiral laminar flow of dilute slurry within a confined space; causing said spirally-flowing slurry to move downward through said confined space; dividing the downward movement into a confined central flow and an annular flow, both flows being circular and downward; continuing the confined central flow downward through and at a lower level out of the confined space; continuing the annular flow downward at increasing angular velocities through a zone of decreasing cross-sectional area to a level below that of the discharge of the central flow; discharging the annular flow through a restricted port at a low level in the confined space; creating a vacuumized space in the upper part of said confined space by maintaining the rates of flow into and out of the confined space sufficiently high to form and maintain a central vortex opening downward from a level high in said confined space to a level within the confined central flow; utilizing the resultant vacuum to draw fluid from a level within the confined space adjacent the annular flow discharge into the vacuumized space; and adjusting both the rate of slurry input and rate of annular flow discharge to produce the desired density of said annular flow discharge slurry.

2. A process according to claim 1 in which the slurry is introduced into the upper levels of an upper annular space and the spiral laminar flow established therein is discharged downwardly therefrom into a space of greater cross-sectional area.

3. A process according to claim 2 in which the angular velocity of the flow within the upper annular space is progressively increased by progressively decreasing the horizontal cross-sectional area of said annular space.

4. In a thickener-separator the combination of a tubular shell comprising an upper tubular section enclosing a first zone, a cover plate closing the upper end of said tubular section, a lower inverted pyramidal section, defining a downwardly extending second zone of decreasing cross-sectional area, the base of said pyramidal section having a perimeter corresponding and attached to that of the lower edge of the tubular section; a feed-conduit means attached to the tubular shell and communicating with the upper levels therein through an open port; a thickened product discharge port near the smaller and lower end of said pyrimidal section; means for controlling the volume of discharge through said thickened product discharge port; a space confining, baffle means within said first zone flaring outwardly and downwardly from a small diameter at the cover plate to a lower level at which it confines a cross-sectional area approximating but less than that confined by the tubular shell and cooperating to form with the wall thereof an upper annular zone of progressively decreasing horizontal cross-sectional area communicating with the remaining space enclosed by the tubular shell through a resricted annular port, and a central discharge conduit comprising an open topped, space-confining means within said tubular shell and substantially concentric therewith, extending from a lower level, but above that of said thickened product discharge port, to a higher level within and under said space confining baffle means, and a discharge conduit in open communication with the space within said confining means and extending therefrom out through said shell at a level lower than the level of open communication.

5. A device as in claim 4 in which a conduit extends from a level near said thickened discharge port into open communication with the space within and under said space-confining baffle means.

6. A device as in claim 5 in which the conduit is provided with means for controlling the flow of fluid and lighter solids therethrough.

7. A device as in claim 4 in which the discharge conduit is reduced to a venturi throat and a branch conduit extends from said throat to a point within the second zone adjacent the thickened product discharge port.

8. A device as in claim 7 in which the branch conduit connects said throat with said conduit at a point between the two ends thereof.

9. In a thickener-separator for treating dilute slurries the combination of a tubular shell comprising an upper tubular section, enclosing a first zone; a cover plate closing the upper end of said tubular section, a lower inverted pyramidal section, defining a downwardly extending second zone of decreasing horizontal cross-sectional area, the base of said pyramidal section having a perimeter corresponding and attached to that of the lower edge of the tubular section; a feed-conduit means communicating with the upper levels within said tubular element through an open feed inlet port; a thickened product discharge port near the smaller and lower end of said pyramidal section; means for controlling the volume of discharge through said thickened product discharge port; and a central discharge conduit, comprising an open topped space confining means within and substantially concentric with said tubular shell, said confining means extending from a lower level in the shell but above that of said thickened product discharge port, to a level higher therein but below the level of said feed inlet port, and a discharge conduit in open communication with the space within said confining means and extending therefrom out through said tubular shell at a level lower than the level of open communication, and a second conduit extending from a level near said thickened-discharge port within and in open communication with the center of said open topped, space confining means at a level above said discharge conduit.

10. In a thickener-separator for treating dilute slurries the combination of a tubular shell comprising an upper tubular section, enclosing a first zone; a cover plate closing the upper end of said tubular section, a lower inverted pyramidal section, defining a downwardly extending second zone of decreasing horizontal cross-sectional area, the base of said pyramidal section having a perimeter corresponding and attached to that of the lower edge of the tubular section; a feed-conduit means communicating with the upper levels within said tubular element through an open feed inlet port; a thickened product discharge port near the smaller and lower end of said pyramidal section; means for controlling the volume of discharge through said thickened product discharge port; and a central discharge conduit, comprising an open topped space confining means within and substantially concentric with said tubular shell, said confining means extending from a lower level in the shell but above that of said thickened product discharge port, to a level higher therein but below the level of said feed inlet port, and a discharge conduit in open communication with the space within said confining means and extending therefrom out through said tubular shell at a level lower than the level of open communication, and a second conduit having one end thereof opening within the second zone with the axis of said opening substantially coincident with the vertical axis of said second zone and said open topped, space confining means for removing a second fraction of fluid and lighter solids.

References Cited in the file of this patent

UNITED STATES PATENTS

| | | |
|---|---|---|
| 1,301,544 | Crombie | Apr. 22, 1919 |
| 1,457,110 | Gay | May 29, 1923 |
| 1,470,531 | Hokanson | Oct. 9, 1923 |
| 1,825,157 | Pardee | Sept. 29, 1931 |
| 2,252,581 | Saint-Jacques | Aug. 12, 1942 |
| 2,518,084 | Smith | Aug. 8, 1950 |